United States Patent [19]
Ehara et al.

[11] 3,933,610
[45] Jan. 20, 1976

[54] DESALINATION PROCESS BY IMPROVED MULTISTAGE ELECTRODIALYSIS

[75] Inventors: Leo Ehara, Yokosuka; Takafumi Miwa, Saitama; Masami Kamaya, Kawasaki, all of Japan

[73] Assignee: Asahi Kasei Kogyo Kabushiki Kaisha, Osaka, Japan

[22] Filed: Mar. 14, 1975

[21] Appl. No.: 558,378

[30] Foreign Application Priority Data
Mar. 30, 1974 Japan............................ 49-35867

[52] U.S. Cl. ........................ 204/180 P; 204/301
[51] Int. Cl.² ................................... B01D 13/02
[58] Field of Search ................... 204/180 P, 301

[56] References Cited
UNITED STATES PATENTS

| | | | |
|---|---|---|---|
| 3,510,417 | 5/1970 | Mizutani et al. | 204/180 P |
| 3,510,418 | 5/1970 | Mizutani et al. | 204/180 P |
| 3,847,772 | 11/1974 | Sata et al. | 204/180 P |

Primary Examiner—John H. Mack
Assistant Examiner—A. C. Prescott

[57] ABSTRACT

Improved multistage electrodialysis process utilizing anion and cation exchange membranes with differing coefficients of divalent ion permselectivity selected and utilized to prevent precipitation of insoluble salts in concentration stream.

15 Claims, 7 Drawing Figures

DESALINATION PROCESS BY IMPROVED MULTISTAGE ELECTRODIALYSIS

BACKGROUND OF THE INVENTION

Multistage electrodialysis procedures for desalination of aqueous salt containing solutions are well known. In accordance with these processes, two or more stages are provided in which electrodialysis cells are divided into alternate dilution and concentration chambers by alternating pairs of anionic and cationic membranes so that each chamber has two boundary members, one an anionic membrane and the other a cationic membrane. The former, upon application of an electric charge, will permit the passage of anions such as chloride or sulfate ions towards the anode. The latter will permit the passage of cations such as calcium or sodium ions towards the cathode.

This process, although very attractive, has not yet realized its full potential because of the tendency of insoluble salt formation in the concentration chamber. Usually these salts are formed from divalent ions present in the water to be treated. The concentration of these ions in the raw water is not sufficiently high so that the salt forms and precipitates. However, in the concentration chambers of multistage electrodialysis units, they become progressively more concentrated so that the salt ultimately precipitates.

It has therefore become the practice in this art to apply water softening procedures to the raw water so as to remove a large proportion of these divalent ions before subjecting the water to electrodialysis. This procedure, while effective, considerably increases the cost of desalination, so that electrodialysis suffers competitively when compared with other desalination processes, such as reverse osmosis or ion exchange.

Accordingly, much effort has been directed to improving electrodialysis procedures utilizing ion selective membranes in attempts to avoid the initial softening step.

Cationic and anionic membranes are well known in the art, and can be prepared by conventional procedures to have a variety of properties. Thus membranes can be prepared which will selectively retain or transport anions or cations. They can also be prepared to selectively retain or transport monovalent anions or cations. Membranes can be prepared which in an electrolytic cell will permit the passage of monovalent cations such as sodium at a greater rate than the passage of divalent cations such as calcium under the influence of an electric charge. Such membranes are known in the art as divalent permselective cationic ion exchange membranes.

Divalent permselective anionic ion exchange membranes which will permit the passage of monovalent anions at a faster rate than the passage of divalent anions are also known.

The divalent ion permselectivity coefficient, for example the coefficient for the calcium ion $F_{Ca}$, or the sulfate ion $F_{SO_4}$ are defined as follows:

The divalent ion permselectivity coefficients referred to here in the specification and claims, i.e., divalent cation permselectivity coefficient ($F_{Ca}$) and divalent anion permselectivity coefficient ($F_{SO_4}$) are defined as follows:

$F_{Ca}$ : relative permselectivity of calcium ion to sodium ion through a cation exchange membrane calculated by the following equation under the measurement conditions set forth below:

$$F_{Ca} = \frac{N_{Ca} / N_{Na}}{C_{Ca} / C_{Na}}$$

wherein $N_{Ca}$ and $N_{Na}$ are normal concentrations of $Ca^{++}$ and $Na^+$ ions, respectively, in concentration streams, and $C_{Ca}$ and $C_{Na}$ are those of $Ca^{++}$ and $Na^+$ ions, respectively, in dilution streams;

$F_{SO_4}$ : relative permselectivity of sulfate ion to chlorine ion through an anion exchange membrane calculated by the following equation under the measurement conditions set forth below:

$$F_{SO_4} = \frac{N_{SO_4} / N_{Cl}}{C_{SO_4} / C_{Cl}}$$

wherein $N_{SO_4}$ and $N_{Cl}$ are normal concentrations of $SO_4^{--}$ and $Cl^-$ ions, respectively, in concentration streams, and $C_{SO_4}$ and $C_{Cl}$ are those of $SO_4^{--}$ and $Cl^-$ ions, respectively, in dilution streams.

Measurement method:

Silver-silver chloride electrodes are set at terminal ends of an electrodialysis frame. The electrodialysis frame is divided into five chambers, namely the anode, dilution, concentration, dilution and cathode chambers, by placing ion-exchange membranes between the electrodes. There are placed in the order from anode of (a) an anion exchange membrane (Aciplex A-101; trade name of Asahi Kasei Kogyo Kabushiki Kaisha, Japan), (b) a cation exchange membrane of which relative permselectivity is to be measured, (c) an anion exchange membrane (Aciplex A-101) and (d) a cation exchange membrane (Aciplex K-101; trade name of Asahi Kasei Kogyo Kabushiki Kaisha, Japan), when $F_{Ca}$ is to be measured. In case of measurement of $F_{SO_4}$, the cation exchange membrane (b) is replaced by cation exchange membrane (Aciplex K-101) and the anion exchange membrane (c) by an anion exchange membrane of which relative permselectivity is to be measured. The ion exchange membranes each have an effective current flow area of 4 cm × 4 cm.

When $F_{Ca}$ is measured, an aqueous mixed salt solution (NaCl = 0.05N; $CaCl_2$ × 0.05N) is passed through dilution chambers at the linear velocity of 10 cm/sec, and the concentration chamber is filled with the same aqueous mixed salt solution. For the measurement of $F_{SO_4}$, an aqueous mixed salt solution (NaCl = 0.05N; $Na_2SO_4$ = 0.05N) is passed through dilution chambers at the linear velocity of 10 cm/sec, and the concentration chamber is filled with the same aqueous salt solution. Through anode and cathode chambers, respectively, are passed 0.1N aqueous sodium chloride solutions. Electrodialysis is carried out at a current density of 2.2 A/dm² at 25°C. Four hours after the start of current passage, the streams are analyzed for ion concentration and the values of $F_{Ca}$ and $F_{SO_4}$ determined.

The Invention

Conventionally in desalination by multistage electrodialysis, the cationic and anionic membranes utilized have been selected with no particular attention to their divalent ion permselectivity coefficients. It has now been discovered that desalination by multistage electrodialysis can be effected without an initial softening step, and without precipitation of insoluble salts in the concentration stream provided that the ion exchange membranes are selected with regard to their divalent ion permselectivy coefficients, and their position in the electrolytic cell.

One of the most important desalination procedures is the desalting of aqueous solutions, such as brine, containing gypsum. For convenience, the process of this invention will be principally described as it relates to this procedure.

The invention will be better understood by reference to the accompanying drawings in which.

In all of these Figures, C and D signify concentration and dilution sides, respectively; T-1 through T-8 tanks for dilution or concentration streams; and $p$-1 through $p$-8 pumps for recycle.

In accordance with the present invention as applied to aqueous streams to be treated which contain scale forming ions, there is provided a process for desalination of an aqueous solution of plural salts by multi-stage electrodialysis with two or more stages which are connected in series to effect dilution in progressive steps, each stage having multiple pairs of anionic and cationic ion exchange membranes placed alternately therein to divide said stage into alternate dilution and concentration chambers, comprising using in at least one stage plural pairs of ion exchange membranes, at least one of the first membranes having a divalent ion permselectivity coefficient less than 0.7, preferably not more than 0.5, and at least one of the second membranes with a coefficient of at least 0.7, the second membranes being cationic when the first membranes is anionic, and anionic when the first membrane is cationic.

The number of the pairs of the membranes having such divalent ion permselectivity coefficients as specified above can be varied depending on the composition of raw water to be treated, the extent of desalination to be desired, the extent of desalination to be desired, the scale of the apparatus and various desalination conditions. In principle, the effect of the present invention can be attained even when only one such pair is used in one stage. The result obtained is better in proportion to the number of such pairs. Practically speaking, therefore, the percentages of such pairs among all pairs in one stage are not less than 50%, more preferably not less than 90%. The result obtained is generally most favorable when substantially all pairs consist of such membranes.

For convenience, the ion exchange membranes with coefficients less than 0.7 are referred to herein as "X membranes" and those with coefficients of 0.7 or more as "Y membranes." When X membranes are cationic, they are denoted by $X_K$; when they are anionic, they are denoted by $X_A$. Similarly, cationic and anionic Y membranes are denoted by $Y_K$ and $Y_A$, respectively.

Normally the coefficient of X membranes is at least 0.001. Similarly, the coefficient of Y membranes is usually less than 100.

In the practice of this invention, each stage may contain plural pairs of X – Y membranes. This is especially preferred when the desired degree of desalination [=(salt concentration in raw water - salt concentration in product water)/salt concentration in raw water] is relatively large. However, in cases when only a relatively low degree of desalination is required, combinations of X and Y membranes are not necessarily required in all the stages. Thus, for example, the invention may be practiced in apparatus in which only one stage has an X–Y combination and other stages have Y—Y or X—X combinations. When all the stages consist of X-Y combinations and both $X_K$–$Y_A$ and $X_A$–$Y_K$ combinations are used, it is possible to perform desalination without salt precipitation even if the extent of desalination is large. This is because both species of monovalent ions, i.e., cations and anions, can effectively be transported into concentration chambers. In preferred embodiments, alternate stages are arranged to have an $X_K$–$Y_A$ combination followed by an $X_A$–$Y_K$ combination.

When X–Y combinations are employed in all stages, all X-membranes may have the same coefficient; that is they may all be the same species, or all Y-membranes may have the same coefficient. When two or more species of X membranes are used, it is preferred that at least one of them have a coefficient of 0.4 or less.

Figure 6:
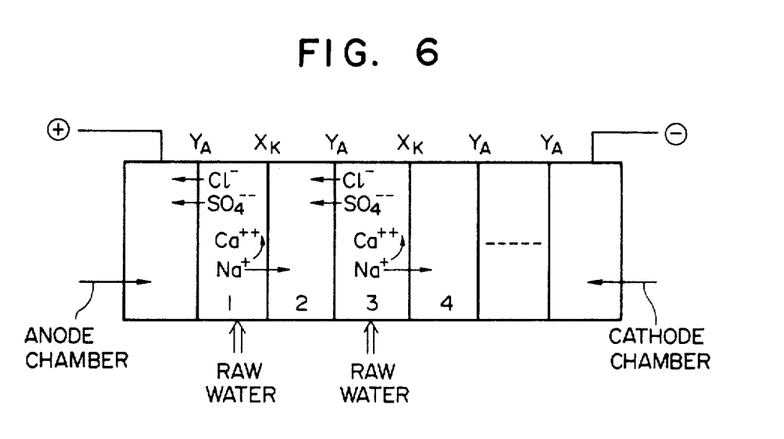
FIGS. 6 and 7 illustrate the details of a two stage process.
Figure 7:
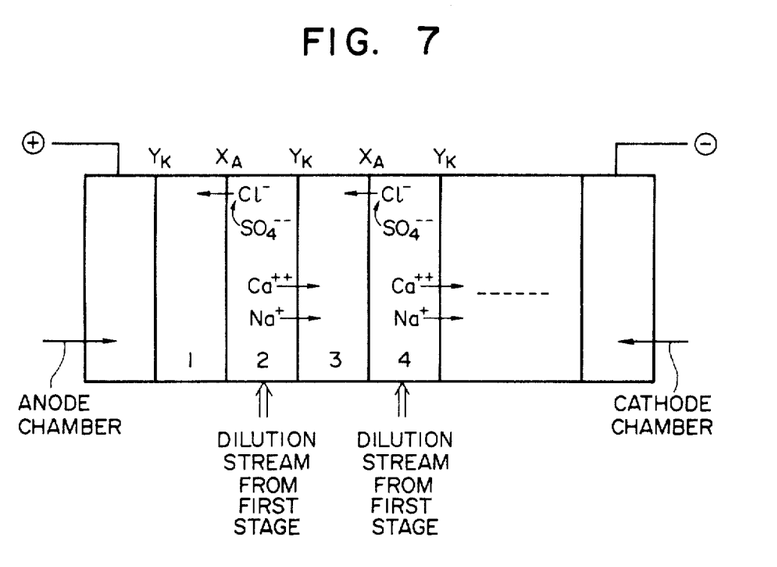

Reference is now made to FIGS. 6 and 7 for a more specific explanation of the process of this invention. The figures represent a two stage process. FIG. 6 is the first stage, and FIG. 7 is the second stage.

In FIG. 6, the dilution chambers are on the anode side of the cation exchange membranes. The concentration chambers are on the cathode side of the cation exchange membranes. Thus 1 and 3 are dilution chambers, and 2 and 4 are concentration chambers.

For purposes of explanation, the $X_K$ and $Y_A$ membranes in both figures are assigned the coefficients $F_{Ca} = 0.1$ and $F_{SO_4} = 1$.

It will be seen in FIG. 6 that the anions in the dilution stream permeate the anionic membranes with equal facility. Hence the proportion of sulfate ion to chloride ion remains constant in the dilution stream. On the other hand, the sodium ions permeate the cationic membranes at a greater rate than do the calcium ions. The result is that the concentration of calcium ion in the dilution stream increases with respect to sodium ion, and the concentration of calcium ions in the concentration chambers does not increase to the point where precipitation of calcium sulfate takes place.

In FIG. 7, the opposite process is observed. In this stage, chambers 1 and 3 are concentration chambers, and 2 and 4 are dilution chambers. In this stage, the membranes are arranged so that sulfate ions are selectively retained in the dilution chambers and retarded from entry into the concentration chambers. The calcium ions, however, enter the concentration chambers at the same rate as the sodium ion. The result is that the calcium ions, which were permitted to accumulate in the dilution chambers in stage 1, now escape from these chambers. However, now the concentration of sulfate ion is not permitted to increase, since it is retained in the dilution chambers. Again, there is no salt precipitation.

It will be seen that in overall effect the initial raw water becomes progressively less rich in ions, and the ultimate concentration stream becomes richer in gypsum forming ions. However, none of the successive, alternate concentration streams are permitted to become sufficiently concentrated with calcium and sulfate ions so that gypsum precipitates.

Those skilled in the art will recognize from the foregoing explanation that the process of this invention is not limited to desalination of solutions containing gypsum forming constituents. It will also be recognized that the divalent ion permselectivity coefficients for the membranes may be values above and below 0.1 and 1. The relative values may also be inverted. To prevent the precipitation of gypsum, the approximate values are above and below 0.7. For other salts, there will be equivalent values. It will be further noted that the advantages of the invention are applicable if only one stage has membranes selected and arranged in accordance with the invention.

In its broadest sense therefore this invention may be defined as an electrodialysis process for the desalination of aqueous salt solutions in which two or more stages for electrodialysis are connected in series to effect dilution by reduction of total ion content in progressive stages, each stage having multiple pairs of anionic and cationic membranes alternately placed therein to divide said stage into alternate dilution and concentration chambers containing dilution and concentration streams, said salt solution containing at least one divalent anion and at least one divalent cation capable of forming an insoluble salt in said concentration stream which comprises selectively retaining at least one of said divalent cations or anions in the dilution stream by conducting electrodialysis through an ion exchange membrane which forms one boundary of said dilution chamber and has a divalent ion permselectivity coefficient which is sufficiently less than one so that the concentration ratio of said selectively retained divalent cation or anion to monovalent ion of the same charge in the dilution chamber is increased and the concentration product of divalent cations and anions which are capable of forming said insoluble salt in the concentration chamber does not exceed the solubility product of the insoluble salt.

Most of conventional ion exchange membranes can be used as Y membranes in the process of this invention. In general, ion exchange membranes have ion exchange groups which may be either inorganic or organic. Both inorganic and organic types can be used in the present invention. Typically useful organic cation exchange groups include, for example, sulfonic, phosphoric and carboxylic acid groups. A typical example of useful inorganic cation exchange groups is zirconium phosphate. Organic anion exchange groups are exemplified by the monomethyl pyridinium group, quaternary ammonium bases such as trimethyl phenyl ammonium group or amino groups such as dimethyl amino group or monomethyl amino group. One typical example of inorganic anion exchange groups is zirconium hydroxide. As is well known, these ion exchange membranes can be prepared by forming starting materials having such ion exchange groups already present into membranes or by introducing such ion exchange groups into membranes previously formed. The divalent ion permselectivity coefficients of the ion exchange membranes will vary depending primarily on the combination of their structures, degree of crosslinking, and substances employed as additives. Any ion exchange membrane can be used as a Y membrane in the present invention, providing it has a divalent permselectivity coefficient of 0.7 or more.

Typical examples of commercially available $Y_K$ membranes are Aciplex K-101 (Asahi Kasei Kogyo Kabushiki Kaisha, Japan), R-61 (Ionics, Inc.), CMG-10 (Asahi Glass, Japan), CL-25T (Tokuyama Soda Co., Japan). Typical examples of $Y_A$ membranes are Aciplex A-101 and A-201 (Asahi Kasei Kogyo Kabushiki Kaisha).

The ion exchange membranes, conventionally known as monovalent ion permselective membranes, can be used as X membranes in the process of the present invention. An $X_K$ membrane may be a cation exchange membrane containing cation groups which are known to be monovalent cation permselective, e.g. carboxylic acid group. Alternatively, $X_K$ membranes can be prepared, as disclosed in Japanese Patent Applications No. 3081/72 and 34676/73, by application of thin layers comprising mainly anion exchange groups on the surface of cation exchange membranes. Likewise, there may be used as $X_A$ membranes anion exchange membranes containing anion groups which are known to be monovalent anion permselective, e.g. monomethyl pyridinium group. $X_A$ membranes may also be prepared, as disclosed in Japanese Patent Applications No. 19980/70 and No. 34676/73, by application of thin layers comprising mainly cation exchange groups on the surface of anion exchange membranes.

The process according to the present invention can be practiced by any multi-stage electrodialysis process. For example, the stream to be desalted (dilution stream) may be recycled in the first stage until it is diluted to a desired concentration, followed by transfer or recycling of the dilution stream into subsequent electrodialysis unit where a similar procedure is repeated. Alternatively, it is not necessarily required to recycle the solution to be desalted (one pass system). During such dilution procedures, concentration may proceed by the recycle system, the one pass system or other systems wherein tanks may or may not be employed. When desalination is performed by use of X membranes, either the anionic or cationic ion exchange membranes and Y membranes as the complementary membranes in at least one stage in the multi-stage electrodialysis process of the invention, precipitate forming tendency is reduced in that stage without adversely affecting the other stages. It is especially preferred to separate concentration streams from X-Y combinations.

The aqueous saltous solution to be treated according to the present process includes all aqueous solutions containing components capable of forming substantially insoluble salts, i.e., salts which are less soluble than 0.1 equivalent/liter-pure water (i.e., 0.1N) at 20°C. Typical examples of such salts often encountered in desalination procedures are barium sulfate and calcium sulfate. The aqueous solutions which are particularly applicable to the process of this invention are brine, brackish water, sewage disposal water and waste liquors from factories.

Figure 4:
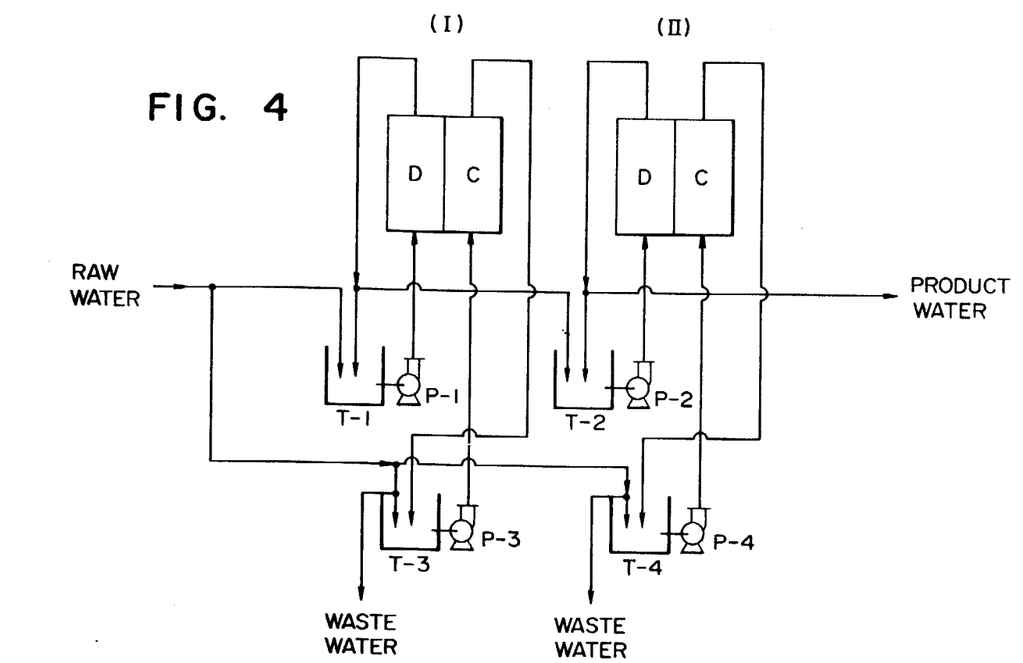
FIG. 4 schematically shows an embodiment wherein the number of the stages is two, the concentration streams are independently recycled and the dilution streams are recycled in each stage.

Referring now to FIG. 4, T-1 is the tank for the dilution stream of the first stage, T-2 the tank for the dilution stream of the second stage, T-3 the tank for the concentration stream of the first stage and T-4 the tank for concentration stream of the second stage; and $p$-1 to $p$-4 are pumps for recycle, respectively. For illustration, suppose the ion exchange membranes are arranged in each stage as follows:

|  | First Stage | Second Stage |
|---|---|---|
| Cation exchange membranes | $X_K$ membranes | $Y_K$ membranes |
| Anion exchange membranes | $Y_A$ membranes | $X_A$ membranes |

When electrodialysis of raw water is performed using ion exchange membranes of this combination, the resulting dilution stream (for reasons explained in more detail above) in the first stage is increased in proportion of $Ca^{++}$ to $Na^+$ ions with little change in proportion of $SO_4^{--}$ to $Cl^-$ ions compared with raw water. On the other hand, the resulting concentration stream in the first stage is increased in proportion of $Na^+$ to $Ca^{++}$ ion with little change in proportion of $SO_4^{--}$ to $Cl^-$ ion compared with the raw water. As the result, the concentration product of $Ca^{++}$ and $SO_4^{--}$ in the concentration stream remains a value far lower than when electrodialysis is performed by use of a combination of Y—Y membranes. Thus, very stable running can be effected. On the other hand, in the second stage, the dilution stream is increased in proportions of $SO_4^{--}$ to $Cl^-$ ions with little change in the ratio of $Na^+$ to $Ca^{++}$; while the concentration stream is increased in proportion of $Cl^-$ to $SO_4^{--}$ ions with little change in the ratio of $Na^+$ to $Ca^{++}$. Therefore, it is possible to maintain the concentration product of gypsum lower than in the case of electrodialysis by use of a combination of Y—Y membranes.

Typical examples of combinations of ion exchange membranes, when multi-stage electrodialysis is conducted in four stages are as follows:

|  |  | Cation exchange membranes | Anion exchange membranes |
|---|---|---|---|
| (I) | 1st stage | $Y_K$ | $X_A$ |
|  | 2nd " | $X_K$ | $Y_A$ |
|  | 3rd " | $X_K$ | $Y_A$ |
|  | 4th " | $Y_K$ | $X_A$ |
| (II) | 1st stage | $Y_K$ | $X_A$ |
|  | 2nd " | $Y_K$ | $X_A$ |
|  | 3rd " | $X_K$ | $Y_A$ |
|  | 4th " | $X_K$ | $Y_A$ |
| (III) | 1st stage | $Y_K$ | $X_A$ |
|  | 2nd " | $X_K$ | $Y_A$ |
|  | 3rd " | $Y_K$ | $X_A$ |
|  | 4th " | $X_K$ | $Y_A$ |
| (IV) | 1st stage | $X_K$ | $Y_A$ |
|  | 2nd " | $Y_K$ | $X_A$ |
|  | 3rd " | $X_K$ | $Y_A$ |
|  | 4th " | $Y_K$ | $X_A$ |

Among these, such combinations as (III) or (IV), herein X membranes are used for cation and anion exchange membranes, respectively, in alternate stages, are the most preferred.

The process of this invention is not effective for batchwise operation or one stage electrodialysis but for multi-stage electrodialysis having two or more stages. The present process is useful for desalination of brine rich in insoluble salt forming components without softening, and can be operated continuously for long periods of time.

The following non-limiting examples are given by way of illustration only. In the examples, all parts and percentages are "by weight" and "% by weight," respectively, and "epm" means "equivalents per million."

EXAMPLE 1

An $X_K$ membrane is prepared from a cation exchange membrane (Aciplex K-101; trade name of Asahi Kasei Kogyo Kabushiki Kaisha, Japan) by a method similar to that as disclosed in Example 7 of Japanese Patent Publication No. 3081/72.

To 100 parts of 4-vinyl pyridine are added 0.2 parts of azobisisobutyronitrile as a polymerization initiator, and polymerization is carried out at 40°C for 16 hours. The linear polymer obtained is subjected to precipitation fractionation with ligroin and dried. One part of this polymer is dissolved in 100 parts of ethanol and this solution is coated on one side of the K-101 membrane, followed by removal of excess linear polymer electrolyte by a rubber roller squeezer. The coated cation exchange membrane is then cured by crosslinking in a mixed solution of 30 parts of dibromoethane and 70 parts of toluene at 60°C for 20 hours to provide an $X_K$ membrane with $F_{Ca}$ value of 0.2.

An $X_A$ membrane is also prepared from an anion exchange membrane (Aciplex A-101; trade name of Asahi Kasei Kogyo Kabushiki Kaisha, Japan) by a method similar to that of Example 2 in Japanese Patent Publication No. 19980/70.

An aqueous solution of potassium polystyrene sulfonic acid obtained by heating a mixture of 10 parts of the potassium salt of styrene sulfonic acid, 90 parts of water and 0.5 parts of potassium persulfate is diluted to 0.3% aqueous solution. The aforesaid A-101 membrane is dipped in this solution for 50 hours to provide an $X_A$ membrane with $F_{SO_4}$ value of 0.03.

These X membranes are used together with the K-101 membranes ($F_{Ca}$ = 1.2) and anion exchange membranes Aciplex A-201 (trade name of Asahi Kasei Kogyo Kabushiki Kaisha; $F_{SO_4}$ = 1.0) as Y membranes. They are arranged in the stages (I) through (IV) illustrated in FIG. 1 in the manner as shown below:

|  | Stage (I) | Stage (II) | Stage (III) | Stage (IV) |
|---|---|---|---|---|
| Cation exchange membranes | K-101 ($F_{Ca}$=1.2) | $X_K$ ($F_{Ca}$=0.2) | K-101 ($F_{Ca}$=1.2) | $X_K$ ($F_{Ca}$=0.2) |
| Anion exchange membranes | $X_A$ ($F_{SO_4}$=0.03) | A-201 ($F_{SO_4}$=1.0) | $X_A$ ($F_{SO_4}$=0.03) | A-201 ($F_{SO_4}$=1.0) |

Figure 1:
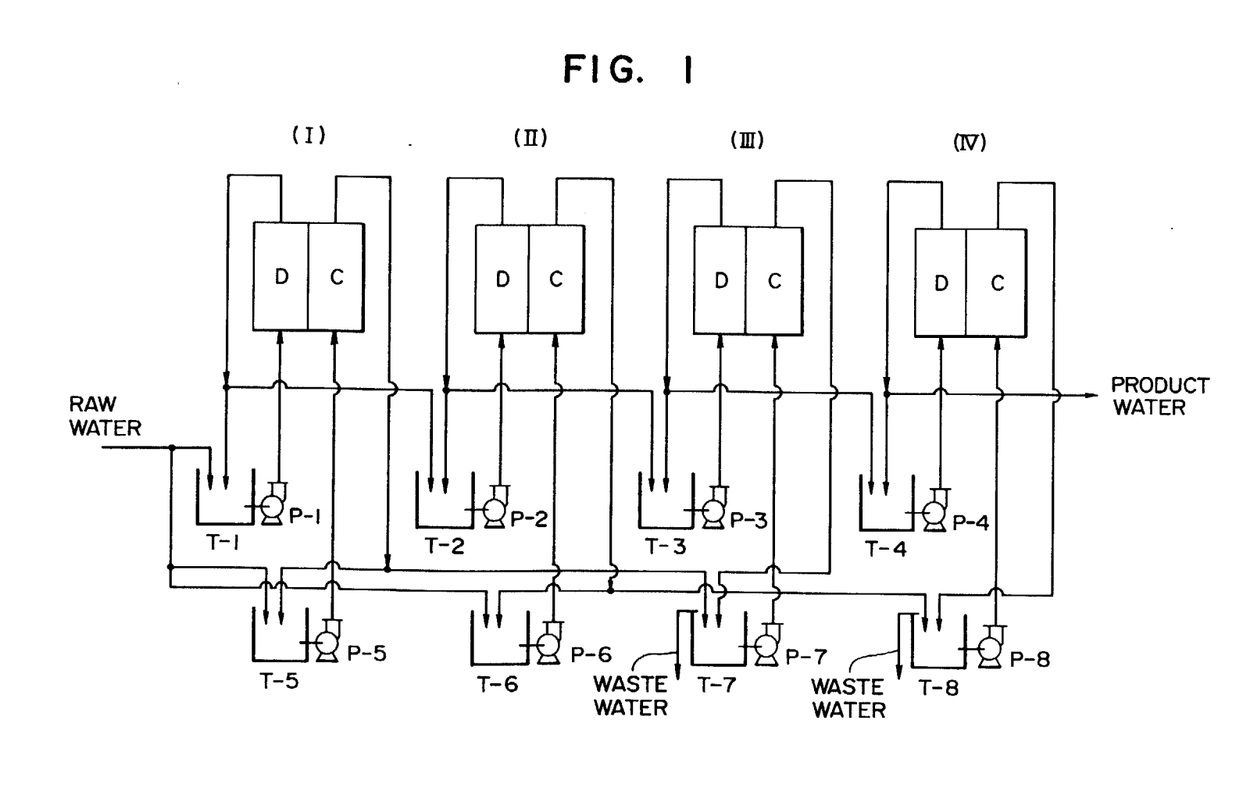
FIG. 1 shows schematic flow diagram for illustration of an embodiment wherein the number of stages is four, the concentration streams of the first and the third stages, and those of the second and the fourth stages are recycled in combination, respectively, and the dilution streams are recycled in each stage.

A raw water with the following ionic composition:

| | |
|---|---|
| Na | 31 epm |
| Ca | 6.1 |
| Mg | 5.5 |
| Cl | 24 |
| $SO_4$ | 18 |
| $HCO_3$ | 0.6 | is subjected to electrodialysis (at 25°C; linear flow velocity = 15 cm/sec) by a multi-stage electrodialysis apparatus of laboratory scale with four stages having 20 pairs of ion exchange membranes in each stage. The schematic flow diagram is shown in FIG. 1. The result obtained is shown in Table 1.

A-201 membranes are used in place of $X_K$ and $X_A$ membranes, respectively. After only 72 hours of electrodialysis, gypsum forms in tanks 5, 6, 7 and 8.

EXAMPLE 2

The same $X_K$ and $X_A$ membranes as prepared in Example 1 are used together with the same K-101 and A-101 membranes as used in Example 1 as Y membranes. They are arranged in the stages (I) through (IV) illustrated in FIG. 2 in the following manner:

| | Stage (I) | Stage (II) | Stage (III) | Stage (IV) |
|---|---|---|---|---|
| Cation exchange membranes | K-101 ($F_{Ca}$=1.2) | K-101 ($F_{Ca}$=1.2) | $X_K$ ($F_{Ca}$=0.2) | $X_K$ ($F_{Ca}$=0.2) |
| Anion exchange membranes | $X_A$ ($F_{SO_4}$=0.03) | $X_A$ ($F_{SO_4}$=0.03) | A-101 ($F_{SO_4}$=0.8) | A-101 ($F_{SO_4}$=0.8) |

The same raw water as used in Example 1 is subjected to electrodialysis (at 25°C; linear flow velocity = 8 cm/sec) using a multi-stage electrodialysis apparatus of laboratory scale stages having 20 pairs of ion ex- Table 1

| Salt Ion | 1st stage (I=1 A/dm²) | | 2nd stage (I=0.8 A/dm²) | | 3rd stage (I=0.6 A/dm²) | | 4th stage (I=0.48 A/dm²) | |
|---|---|---|---|---|---|---|---|---|
| | Dil. stream (epm) | Conc. stream (epm) | Dil. stream (epm) | Conc. stream (epm) | Dil. stream (epm) | Conc. stream (epm) | Dil. stream (epm) | Conc. stream (epm) |
| Na | 23.6 | 102.8 | 15.9 | 125.0 | 12.1 | 135.4 | 7.9 | 170.5 |
| Ca | 4.3 | 23.1 | 4.1 | 9.3 | 2.9 | 33.4 | 2.7 | 11.3 |
| Mg | 3.9 | 20.8 | 3.7 | 8.4 | 2.6 | 30.0 | 2.4 | 10.2 |
| Cl | 13.6 | 127.3 | 10.1 | 68.2 | 4.4 | 177.9 | 3.2 | 79.5 |
| $SO_4$ | 17.9 | 19.4 | 13.3 | 74.5 | 13.1 | 20.9 | 9.7 | 112.5 |
| $HCO_3$ | 0.3 | — | 0.3 | — | 0.1 | — | 0.1 | — |
| Total | 31.8 | 146.7 | 23.7 | 142.7 | 17.6 | 198.8 | 13.0 | 192 |

Note: The concentration streams are maintained at pH 6.0 by addition of hydrochloric acid. "I" means current density.

Figure 2:
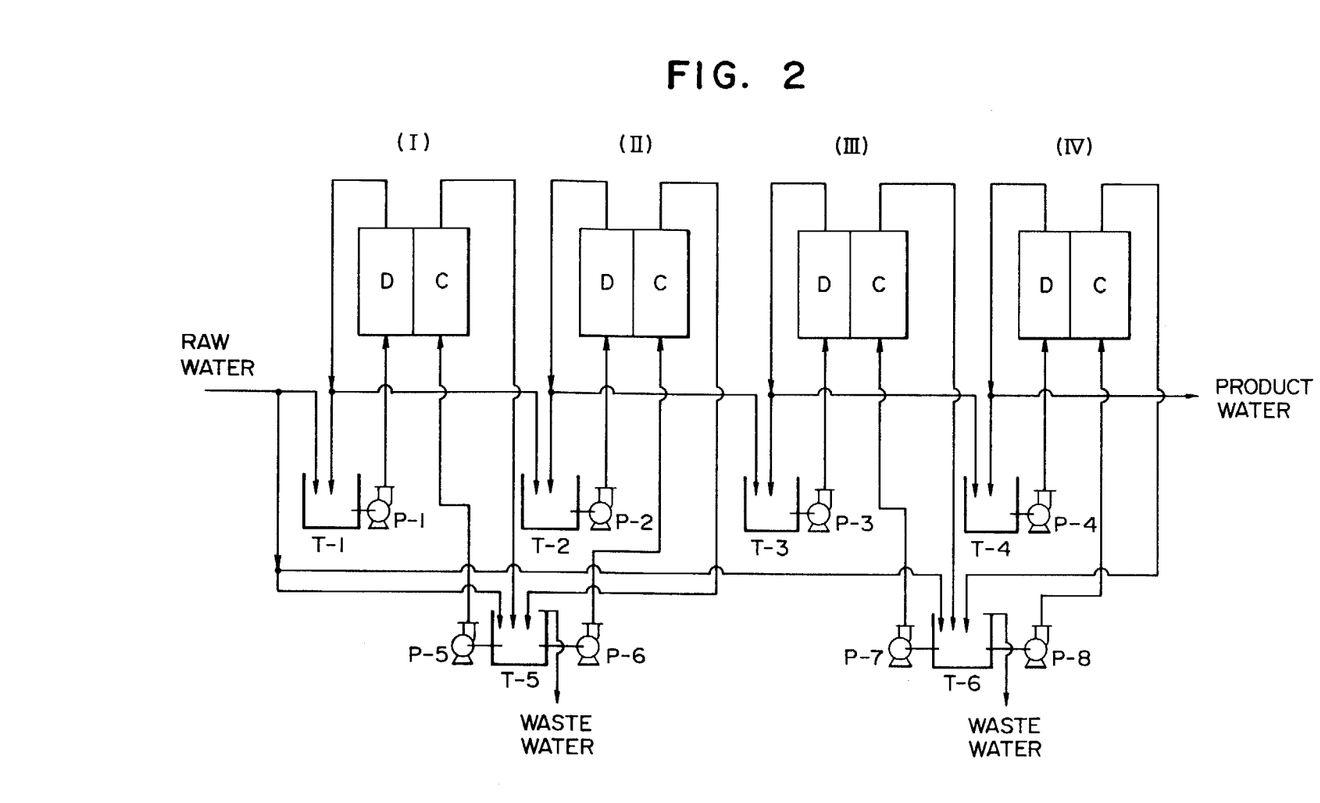
FIG. 2 schematically shows an embodiment wherein the number of stages is four, the concentration streams of the first and the second stages, and those of the third and the fourth stages are recycled in combination, respectively, and the dilution streams are recycled in each stage.

The above electrodialysis is conducted for one month without formation of gypsum in tanks T-5, T-6, T-7 and T-8.

change membranes in each stage. The schematic flow diagram is shown in FIG. 2. The results are shown in Table 2.

Table 2

| Salt Ion | 1st stage (I=0.7 A/dm²) | | 2nd stage (I=0.56 A/cm²) | | 3rd stage (I=0.43 A/dm²) | | 4th stage (I=0.33 A/dm²) | |
|---|---|---|---|---|---|---|---|---|
| | Dil. stream (epm) | Conc. stream (epm) | Dil. stream (epm) | Conc. stream (epm) | Dil. stream (epm) | Conc. stream (epm) | Dil. stream (epm) | Conc. stream (epm) |
| Na | 23.6 | 86.8 | 17.8 | 126.2 | 12.1 | 86.0 | 7.9 | 123.2 |
| Ca | 4.3 | 19.3 | 3.0 | 28.0 | 2.9 | 7.8 | 2.7 | 9.5 |
| Mg | 3.9 | 17.4 | 2.8 | 25.3 | 2.6 | 7.0 | 2.4 | 8.5 |
| Cl | 13.6 | 104.4 | 5.9 | 158.8 | 4.1 | 41.7 | 2.8 | 52.7 |
| $SO_4$ | 17.9 | 19.1 | 17.6 | 20.7 | 13.4 | 59.1 | 10.1 | 88.5 |
| $HCO_3$ | 0.3 | — | 0.1 | — | 0.1 | — | 0.1 | — |
| Total | 31.8 | 123.5 | 23.6 | 179.5 | 17.6 | 100.8 | 13.0 | 141.2 |

Note: The concentration streams are maintained at pH 6.0 by addition of hydrochloric acid.

COMPARATIVE EXAMPLE 1

Electrodialysis of raw water is conducted in the same manner as in Example 1, except that the K-101 and The above electrodialysis is conducted for one month, without gypsum formation in tanks T-5 and T-6.

COMPARATIVE EXAMPLE 2

Electrodialysis of raw water is conducted in the same manner as in Example 2, except that the K-101 and A-101 membranes are used in place of the $X_K$ and $X_A$ membranes, respectively. After electrodialysis for only 72 hours, gypsum is found to be formed in the tank T-6.

EXAMPLE 3

Figure 3:
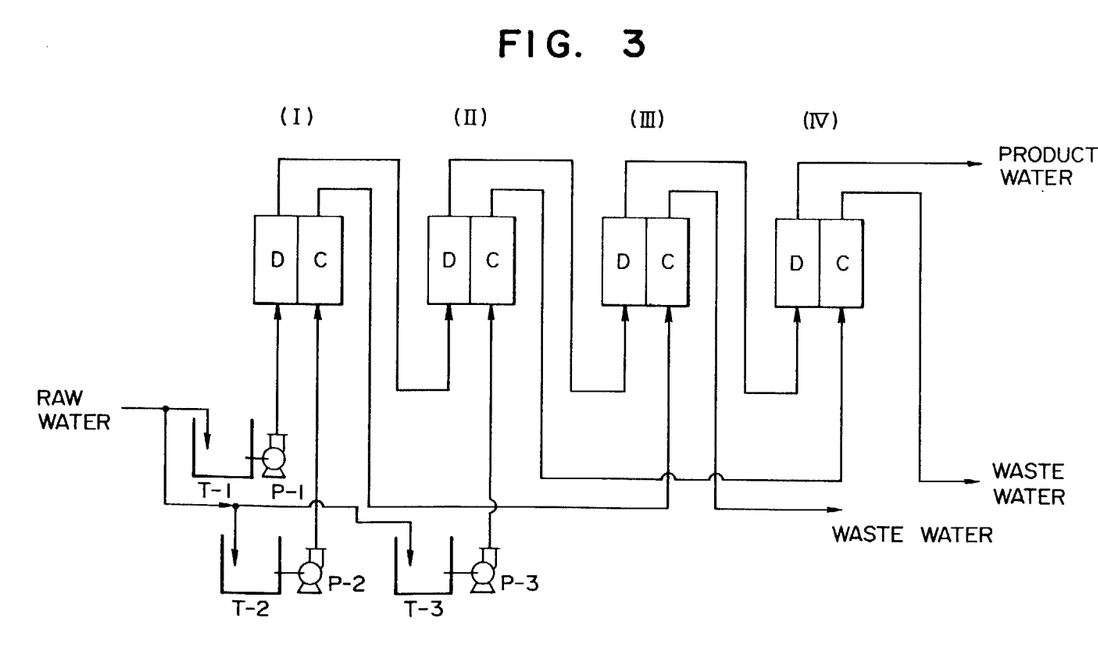
FIG. 3 schematically shows an embodiment wherein the number of the stages is four, the concentration streams of the first and the third stages, and those of the second and the fourth stages are recycled in combination, respectively, and the dilution stream is not recycled.

Electrodialysis of the same raw water as used in Example 1 is performed by a multi-stage electrodialysis laboratory scale apparatus with four stages, each with 20 membrane pairs (at 25°C, linear flow velocity = 10 cm/sec). The schematic flow diagram is shown in FIG. 3. The same ion exchange membranes are used as in Example 1, but the arrangement is changed to that as shown below:

|  | Stage (I) | Stage (II) | Stage (III) | Stage (IV) |
|---|---|---|---|---|
| Cation exchange membranes | $X_K$ ($F_{Ca}$=0.2) | K-101 ($F_{Ca}$=1.2) | $X_K$ ($F_{Ca}$=0.2) | K-101 ($F_{Ca}$=1.2) |
| Anion exchange membranes | A-201 ($F_{SO4}$=1.0) | $X_A$ ($F_{SO4}$=0.03) | A-201 ($F_{SO4}$=1.0) | $X_A$ ($F_{SO4}$=0.03) |

The result obtained is shown in Table 3.

Table 3

| Salt Ion | 1st stage (I=1 A/dm²) | | 2nd stage (I=0.8 A/dm²) | | 3rd stage (I=0.6 A/dm²) | | 4th stage (I=0.48 A/dm²) | |
|---|---|---|---|---|---|---|---|---|
|  | Dil. stream (epm) | Conc. stream (epm) | Dil. stream (epm) | Conc. stream (epm) | Dil. stream (epm) | Conc. stream (epm) | Dil. stream (epm) | Conc. stream (epm) |
| Na | 20.9 | 112.9 | 15.9 | 78.8 | 10.2 | 153.5 | 7.9 | 99.8 |
| Ca | 5.7 | 9.1 | 4.1 | 22.0 | 3.8 | 11.1 | 2.7 | 31.6 |
| Mg | 5.2 | 8.2 | 3.7 | 19.8 | 3.4 | 10.0 | 2.4 | 28.6 |
| Cl | 17.9 | 75.2 | 10.1 | 101.6 | 7.5 | 94.0 | 3.2 | 140.0 |
| SO₄ | 13.4 | 55.0 | 13.3 | 19.0 | 9.9 | 80.6 | 9.7 | 20.0 |
| HCO₃ | 0.4 | — | 0.3 | — | 0.1 | — | 0.1 | — |
| Total | 31.8 | 130.2 | 23.7 | 120.6 | 17.5 | 174.6 | 13.0 | 160.0 |

Note: The concentration streams are maintained at pH 6.0 by addition of hydrochloric acid.

During continuous running for 1 month, no gypsum was formed in the outlets for the waste concentration streams.

COMPARATIVE EXAMPLE 3

When identical electrodialysis of raw water was performed for 72 hours using membranes K-101 and A-201 in place of the $X_K$ and $X_A$ membranes, gypsum was formed in the outlets for waste concentration streams.

EXAMPLE 4

A raw water with the following composition of salt ions:

| | |
|---|---|
| Na | 12.06 epm |
| Ca | 4.18 |
| Mg | 0 |
| Cl | 9.75 |
| SO₄ | 6.49 |
| HCO₃ | 0 | is subjected to electrodialysis (at 25°C; linear flow velocity = 15 cm/sec) by a multi-stage electrodialysis laboratory scale apparatus with two stages with 20 pairs of membranes in each stage. The schematic flow diagram is shown in FIG. 4. The same $X_K$ membranes as used in Example 1 and the same K-101 membranes and A-101 membranes as described in Example 1 are used according to the following arrangement:

|  | Stage (I) | Stage (II) |
|---|---|---|
| Cation exchange membranes | $X_A$ ($F_{Ca}$=0.2) | K-101 ($F_{Ca}$=1.2) |
| Anion exchange membranes | A-101 ($F_{SO4}$=0.8) | A-101 ($F_{SO4}$=0.8) |

The result is shown in Table 4.

Table 4

| Salt ion | 1st stage (I=0.4 A/dm²) | | 2nd stage (I=0.24 A/dm²) | |
|---|---|---|---|---|
|  | Dil. stream (epm) | Conc. stream (epm) | Dil. stream (epm) | Conc. stream (epm) |
| Na | 5.44 | 78.72 | 3.15 | 34.48 |
| Ca | 3.74 | 8.59 | 1.85 | 23.08 |
| Mg | — | — | — | — |
| Cl | 5.14 | 56.18 | 2.57 | 35.12 |
| SO₄ | 4.04 | 31.13 | 2.43 | 22.44 |
| HCO₃ | — | — | — | — |
| Total | 9.18 | 87.31 | 5.00 | 57.56 |

The above electrodialysis is performed for one month, during which no gypsum is formed in the tanks T-3 and T-4.

COMPARATIVE EXAMPLE 4

Example 4 is repeated, but K-101 membranes are used in place of the $X_K$ membranes in stage (I). Gypsum was observed to form in the tank T-3 after running for 72 hours.

EXAMPLE 5

A raw water with the following composition of salt ions:

| | |
|---|---|
| Na | 2.46 epm |
| Ca | 5.28 |
| Mg | 1.61 |
| Cl | 2.15 |
| SO₄ | 4.05 |
| HCO₃ | 3.15 | is subjected to electrodialysis (at 20°C; linear flow velocity = 8 cm/sec) by a multi-stage electrodialysis apparatus of a laboratory scale with two stages, each having 20 membrane pairs. The schematic flow diagram is shown in FIG. 4. The same $X_K$ and $X_A$ membranes as used in Example 1 and the same K-101 and A-101 membranes as described in Example 1 are combined as follows:

|  | Stage (I) | Stage (II) |
|---|---|---|
| Cation exchange membranes | $X_K(F_{Ca}=0.2)$ | K-101($F_{Ca}=1.2$) |
| Anion exchange | A-101($F_{SO_4}=0.8$) | $X_A(F_{SO_4}=0.03)$ |

Table 5 shows the result of the electrodialysis.

Table 5

| Salt ion | 1st stage (I=0.20 A/dm²) | | 2nd stage (I=0.12 A/dm²) | |
|---|---|---|---|---|
|  | Dil. stream (epm) | Conc. stream (epm) | Dil. stream (epm) | Conc. stream (epm) |
| Na | 0.02 | 22.7 | 0.02 | 2.4 |
| Ca | 4.15 | 14.7 | 2.26 | 29.5 |
| Mg | 1.49 | 2.6 | 0.98 | 8.1 |
| Cl | 1.22 | 24.3 | 0.26 | 35.7 |
| SO₄ | 2.65 | 15.7 | 2.62 | 4.3 |
| HCO₃ | 1.79 | — | 0.38 | — |
| Total | 5.66 | 40.0 | 3.26 | 40.0 |

Note: The concentration streams are maintained at pH 6.0 by injection of hydrochloric acid.

Electrodialysis was continued for one month, with no gypsum formation in tanks T-3 and T-4.

COMPARATIVE EXAMPLE 5

Example 5 is repeated, but the K-101 membranes and A-101 membranes are used in place of the $X_K$ and $X_A$ membranes, respectively. After only 24 hours, gypsum was observed in tanks 3 and 4.

EXAMPLE 6

An $X_K$ membrane is prepared by the same method as described in Example 1 of Japanese Patent Publication No. 3081/72. Specifically, a cation exchange membrane (Aciplex K-101; $F_{Ca} = 1.2$: trade name of Asahi Kasei Kogyo Kabushiki Kaisha, Japan) is treated in the following manner:

To 90 parts of methaphenylene diamine hydrochloride are added 21 parts of dicyandiamide and 10 parts of water, and the composition is mixed at 90°C for 2 hours. After further addition of 7.5 parts of paraform to the mixture, the reaction is continued for an additional 8 hours. Five parts of a viscous fluid of the resulting condensate are dissolved in 50 parts of water. Into this solution is dipped the aforesaid K-101 membrane at 90°C for 10 hours for coating treatment. After the treatment, the coated membrane is rinsed with water to remove excessive condensate, and then dipped into a crosslinking curing liquid, prepared by adding 8 parts of furfural and 0.5 parts of concentrated hydrochloric acid to 100 parts of water, at 40°C for 30 minutes. After drying in air, it is subjected to crosslink curing at 110°C for 4 hours to provide a cation exchange membrane having $F_{Ca}$ value of 0.5.

An $X_A$ membrane is also prepared by treatment of an anion exchange membrane (Aciplex A-101; $F_{SO_4} = 0.8$: trade name of Asahi Kasei Kogyo Kabushiki Kaisha, Japan) in the manner similar to Example 3 of Japanese Patent Publication No. 19980/70.

An aqueous polymethacrylic acid solution obtained by heating a mixture of 10 parts of methacrylic acid, 90 parts of water and 0.2 parts of ammonium persulfate is diluted to 0.25% aqueous solution. Into this solution is dipped the aforesaid A-101 membrane for 50 hours to obtain an anion exchange membrane having $F_{SO_4}$ value of 0.06.

The $X_K$ and $X_A$ membranes thus prepared are used in combination with the K-101 and the A-101 membranes as Y membranes for electrodialysis. They are arranged in stages (I) and (II) illustrated in FIG. 5 in the manner as shown below:

|  | Stage (I) | Stage (II) |
|---|---|---|
| Cation exchange membranes | K-101($F_{Ca}=1.2$) | $X_K(F_{Ca}=0.5)$ |
| Anion exchange membranes | $X_A(F_{SO_4}=0.06)$ A-101($F_{SO_4}=0.8$) |  |

Figure 5:
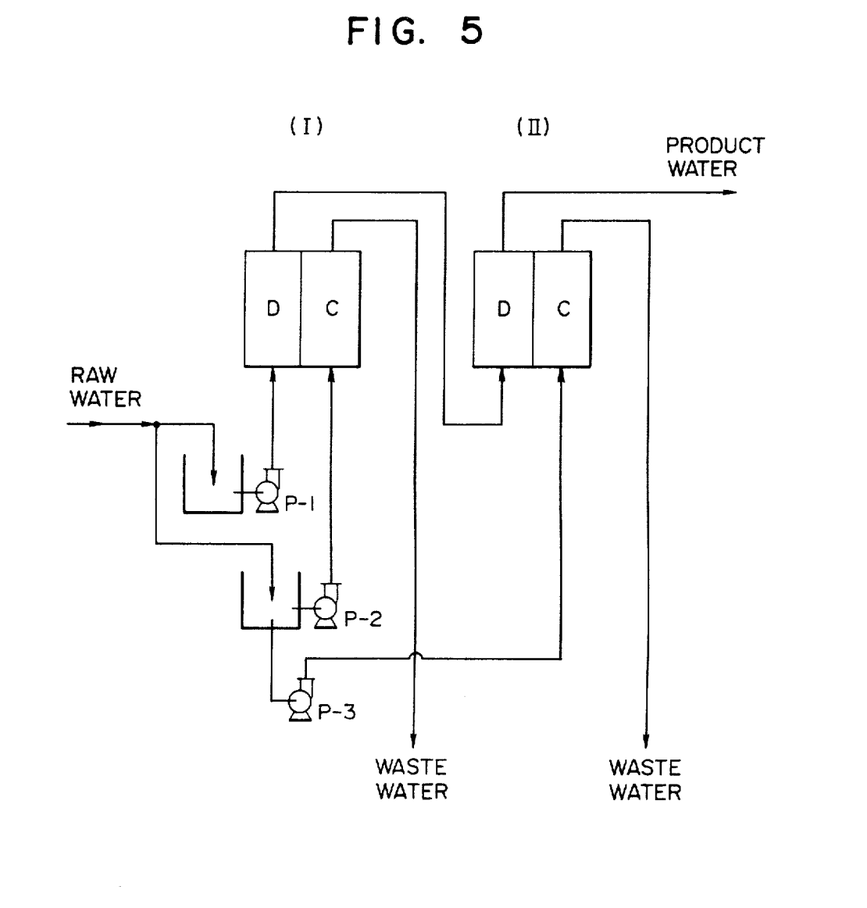
FIG. 5 schematically shows an embodiment wherein the number of the stages is two, the concentration streams are independent and not recycled, and the dilution stream is not recycled.

A raw water with the following ionic composition:

| Na | 4.82 epm |
|---|---|
| Ca | 4.23 |
| Mg | 2.59 |
| Cl | 3.22 |
| SO₄ | 5.16 |
| HCO₃ | 3.26 | is subjected to electrodialysis using a two-stage laboratory scale electrodialysis apparatus having 20 membrane pairs per stage (at 20°C; linear flow velocity = 5 cm/sec). The schematic flow diagram is shown in FIG. 5. The salt ion compositions of the streams in each stage obtained as the result of electrodialysis are shown in Table 6.

Table 6

| Salt ion | 1st stage (I=0.26 A/dm²) | | 2nd stage (I=0.17 A/dm²) | |
|---|---|---|---|---|
|  | Dil. stream (epm) | Conc. stream (epm) | Dil. stream (epm) | Conc. stream (epm) |
| Na | 3.29 | 14.7 | 1.21 | 31.4 |
| Ca | 2.06 | 18.2 | 1.41 | 12.4 |
| Mg | 1.60 | 9.0 | 1.30 | 6.3 |
| Cl | 0.98 | 35.5 | 0.48 | 19.0 |
| SO₄ | 4.97 | 6.4 | 2.95 | 31.1 |
| HCO₃ | 1.00 | — | 0.49 | — |
| Total | 6.95 | 41.9 | 3.92 | 50.1 |

Note: The concentration streams are maintained at ph 6.0 by addition of hydrochloric acid.

After running for one month, no gypsum is formed in the outlets for waste concentration streams.

COMPARATIVE EXAMPLE 6

Example 6 is repeated, but the $X_A$ and $X_K$ membranes are replaced by the membranes K-101 and A-101, respectively. After 72 hours of running, gypsum is formed in the outlet for waste concentration stream in the first stage.

EXAMPLE 7

An $X_K$ membrane is prepared from a cation exchange membrane (Aciplex K-101; trade name of Asahi Kasei Kogyo Kabushiki Kaisha, Japan) by a method similar to that as disclosed in Example 10 of Japanese Patent Publication No. 3081/72.

To a mixture of 60 parts of chloromethylated styrene monomer, 20 parts of acetoxy styrene and 20 parts of styrene are added 0.4 parts of lauryl peroxide. Polymerization is performed at 45°C for 12 hours. The resulting polymer is precipitated by using methanol and separated by filtration. Then, the polymer is dissolved in benzene and into the solution is injected trimethyl amine gas to saturate the solution therewith, followed by amination at 50°C for 2 hours. After amination, the polymer separates from the benzene layer. The separated polymer is washed with acetone and dried. 50 Parts of the aminated polymer are charged into 200 parts of aqueous caustic soda solution to hydrolyze acetoxy groups by treating at 100°C for 15 hours. After excessive alkali is neutralized with hydrochloric acid, water is added to the resultant until the concentration of the high molecular electrolyte is diluted to 0.2%. The thus prepared aqueous high molecular electrolyte solution is passed through dilution chambers of an electrodialysis apparatus wherein the K-101 membranes to be treated and anion membranes (Aciplex A-101: trade name of Asahi Kasei Kogyo Kabushiki Kaisha, Japan) alternately, while 3.0 N sodium chloride solution is passed through the concentration chambers. The treatment is performed under direct current of 0.1 A/dm² for 3 hours. Then, the coated K-101 cation exchange membrane is immersed in 37% aqueous formalin solution to effect crosslinking treatment at 80°C for 20 hours, whereby there is obtained an $X_K$ membrane having $F_{Ca}$ value of 0.05.

An $X_A$ membrane is also prepared from an anion exchange membrane (Aciplex A-201; trade name of Asahi Kasei Kogyo Kabushiki Kaisha, Japan) by a method similar to that of Example 6 in Japanese Patent Publication No. 19980/70.

A copolymer prepared from 5 parts of methyl acrylate, 5 parts of vinyl acetate, 90 parts of water, 2 parts of benzoyl peroxide and 5 parts of magnesium sulfate is hydrolyzed to give a high molecular electrolyte. In an aqueous solution containing 1% of this electrolyte is immersed the A-201 membrane to be treated at 25°C for 24 hours, to obtain an $X_A$ membrane having $F_{SO_4}$ value of 0.4.

These X membranes are used together with the K-101 membranes ($F_{Ca} = 1.2$) and anion exchange membranes Aciplex A-201 ($F_{SO_4} = 1.0$) as Y membranes. They are arranged in the stages (I) and (II) illustrated in FIG. 4 in the manner as shown below:

|  | Stage (I) | Stage (II) |
| --- | --- | --- |
| Cation exchange membranes | K-101 ($F_{Ca}=1.2$) | $X_K$ ($F_{Ca}=0.05$) |
| Anion exchange membranes | $X_A$ ($F_{SO_4}=0.4$) | A-201 ($F_{SO_4}=1.0$) |

A raw water with the following ionic composition:

| | |
| --- | --- |
| Na | 7.23 epm |
| Ca | 3.50 |
| Mg | 1.61 |
| Cl | 2.15 |
| SO₄ | 7.36 |
| HCO₃ | 2.83 | is subjected to electrodialysis (at 25°C; linear flow velocity = 15 cm/sec) by a multi-stage electrodialysis apparatus of laboratory scale with four stages having 20 pairs of ion exchange membranes in each stage. The schematic flow diagram is shown in FIG. 4. The result obtained is shown in Table 7.

Table 7

| Salt ion | 1st stage (I=0.4 A/dm²) | | 2nd stage (I=0.26 A/dm²) | |
| --- | --- | --- | --- | --- |
| | Dil. stream | Conc. stream | Dil. stream | Conc. stream |
| Na | 4.67 | 38.4 | 1.65 | 63.5 |
| Ca | 2.01 | 21.6 | 1.95 | 4.5 |
| Mg | 0.93 | 10.0 | 0.90 | 2.0 |
| Cl | 0.87 | 41.4 | 0.51 | 20.0 |
| SO₄ | 5.61 | 28.6 | 3.32 | 50.0 |
| HCO₃ | 1.13 | — | 0.67 | — |
| Total | 7.61 | 70.0 | 4.50 | 70.0 |

Note: The concentration streams are maintained at pH 6.0 by addition of hydrochloric acid.

During continuous running for 1 month, no gypsum was formed in the tanks T-3 and T-4.

COMPARATIVE EXAMPLE 7

When identical electrodialysis of the raw water was performed for 72 hours using membranes K-101 and A-201 in place of the $X_K$ and $X_A$ membranes, gypsum was formed in the tanks T-3 and T-4.

EXAMPLE 8

As $X_K$ membrane, the same membrane as used in Example 7 is employed.

An $X_A$ membrane is prepared from Aciplex A-201 membrane by a method similar to that as disclosed in Example 7 in Japanese Patent Publication No. 19980/70. Namely, said A-201 membrane is dipped at 25°C for 24 hours in 5% aqueous solution of calcium salt of a polystyrene sulfonic acid which is obtained by sulfonating commercially available polystyrene with molecular weight of about 80,000 with conc. sulfuric acid. The thus treated anion exchange membrane has $F_{SO_4}$ value of 0.2.

These X membranes are used together with the K-101 membranes ($F_{Ca} = 1.2$) and anion exchange membranes Aciplex A-201 ($F_{SO_4} = 1.0$) as Y membranes. They are arranged in the stages (I) and (II) illustrated in FIG. 4 in the manner as shown below:

|  | Stage (I) | Stage (II) |
| --- | --- | --- |
| Cation exchange membranes | $X_K$ ($F_{Ca}=0.05$) | K-101 ($F_{Ca}=1.2$) |
| Anion exchange membranes | A-201 ($F_{SO_4}=1.0$) | $X_A$ ($F_{SO_4}=0.2$) |

A raw water having the same ionic composition as used in Example 7 is subjected to electrodialysis under the same conditions as in Example 7. The result obtained is shown in Table 8.

Table 8

| Salt ion | 1st stage | | 2nd stage | |
|---|---|---|---|---|
| | (I=0.4 A/dm²) | | (I=0.26 A/dm²) | |
| | Dil. stream | Conc. stream | Dil. stream | Conc. stream |
| Na | 2.64 | 63.0 | 1.69 | 24.7 |
| Ca | 3.40 | 4.8 | 1.93 | 31.0 |
| Mg | 1.57 | 2.2 | 0.88 | 14.3 |
| Cl | 1.32 | 28.3 | 0.28 | 49.8 |
| SO₄ | 4.54 | 41.7 | 3.84 | 20.2 |
| HCO₃ | 1.75 | — | 0.38 | — |
| Total | 7.61 | 70.0 | 4.50 | 70.0 |

Note: The concentration streams are maintained at pH 6.0 by addition of hydrochloric acid.

During continuous running for 1 month, no gypsum was formed in the tanks T-3 and T-4.

COMPARATIVE EXAMPLE 8

When identical electrodialysis of the raw water was performed for 72 hours using membranes K-101 and A-201 membranes in place of the $X_K$ and $X_A$ membranes, gypsum was formed in the tanks T-3 and T-4.

What is claimed is:

1. An electrodialysis process for the desalination of aqueous salt solutions in which two or more stages for electrodialysis are connected in series to effect dilution by reduction of total ion content in progressive stages, each stage having multiple pairs of anionic and cationic membranes alternately placed therein to divide said stage into alternate dilution and concentration chambers containing dilution and concentration streams, said salt solution containing at least one divalent anion and at least one divalent cation capable of forming an insoluble salt in said concentration stream which comprises selectively retaining at least one of said divalent cations or anions in the dilution stream by conducting electrodialysis through an ion exchange membrane which forms one boundary of said dilution chamber and has a divalent ion permselectivity coefficient which is sufficiently less than one so that the concentration ratio of said selectively retained divalent cation or anion to monovalent ion of the same charge in the dilution chamber is increased and the concentration product of divalent cations and anions which are capable of forming said insoluble salt in the concentration chamber does not exceed the solubility product of the insoluble salt.

2. In a process for desalination of an aqueous salt solution containing ions capable of forming gypsum by multi-stage electrodialysis with at least two stages which are connected in series to effect dilution in progressive steps, each stage having multiple pairs of anionic and cationic ion exchange membranes placed alternately therein to divide said stage into alternate dilution and concentration chambers, the improvement comprising using in at least one stage plural pairs of ion exchange membranes, at least one of the first membranes having a divalent ion permselectivity coefficient for calcium or sulfate ions of less than 0.7 as one of said anionic and cationic ion exchange membranes, and at least 0.7 for at least one of the second membranes, the second membrane being cationic when the first membrane is anionic, and anionic when the first membrane is cationic.

3. A process as claimed in claim 2, wherein the coefficient of substantially all of the first membranes in each stage is less than 0.7, and of the second membrane is at least 0.7.

4. A process as claimed in claim 2, wherein the coefficient of the first ion exchange membrane is less than 0.5.

5. A process as claimed in claim 3, wherein the coefficient of the first ion exchange membrane is less than 0.5.

6. A process as claimed in claim 3, wherein said first and second ion exchange membranes are used in alternate stages, respectively.

7. A process as claimed in claim 5, wherein said first and second ion exchange membranes are used in alternate stages.

8. A process as claimed in claim 2, wherein at least two cationic ion exchange membranes in different stages have different coefficients.

9. A process as claimed in claim 2, wherein at least two anionic ion exchange membranes in different stages have different coefficients.

10. A process as claimed in claim 8, wherein the coefficient of the cationic ion exchange membrane is less than 0.4.

11. A process as claimed in claim 9, wherein the coefficient of the anionic ion exchange membrane is less than 0.4.

12. A process as claimed in claim 2, wherein concentrated aqueous solutions in different stages are joined into separate streams.

13. A process as claimed in claim 2, wherein concentrated aqueous solutions in stages having the combination of ion exchange membranes defined in claim 2 are joined into streams which are separate from those in stages having ion exchange membranes different from such combination.

14. A process as claimed in claim 2, wherein the solution to be desalted is passed successively through the stages in one pass per each stage.

15. A process as claimed in claim 2, wherein the solution to be desalted is recycled in each stage.

* * * * *